US012786147B2

(12) United States Patent
Shi

(10) Patent No.: US 12,786,147 B2
(45) Date of Patent: Nov. 3, 2026

(54) INSTANT MESSAGING GROUP MESSAGE PROCESSING METHOD AND APPARATUS

(71) Applicant: VIVO MOBILE COMMUNICATION CO., LTD., Guangdong (CN)

(72) Inventor: Penggang Shi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 50 days.

(21) Appl. No.: 18/756,981

(22) Filed: Jun. 27, 2024

(65) Prior Publication Data

US 2024/0348565 A1 Oct. 17, 2024

Related U.S. Application Data

(63) Continuation of application No. PCT/CN2022/143765, filed on Dec. 30, 2022.

(30) Foreign Application Priority Data

Dec. 31, 2021 (CN) ......................... 202111673906.6

(51) Int. Cl.
*G06F 15/16* (2006.01)
*H04L 51/04* (2022.01)
*H04L 51/216* (2022.01)

(52) U.S. Cl.
CPC ............ *H04L 51/04* (2013.01); *H04L 51/216* (2022.05)

(58) Field of Classification Search
CPC .............................. H04L 51/04; H04L 51/216
USPC .......................................................... 709/206
See application file for complete search history.

(56) References Cited

U.S. PATENT DOCUMENTS

| | | | | |
|---|---|---|---|---|
| 8,516,060 | B2 * | 8/2013 | Xie | H04L 67/10<br>709/206 |
| 8,880,627 | B2 * | 11/2014 | Davenport | H04L 51/56<br>709/204 |
| 9,560,001 | B1 * | 1/2017 | Collins | H04L 51/52 |
| 10,003,559 | B2 * | 6/2018 | Narayanswamy | H04L 51/212 |
| 10,021,059 | B1 * | 7/2018 | Rao | G06F 21/10 |
| 10,536,422 | B1 * | 1/2020 | Rao | G06F 21/10 |

(Continued)

FOREIGN PATENT DOCUMENTS

| | | |
|---|---|---|
| CN | 105376137 A | 3/2016 |
| CN | 106100969 A | 11/2016 |

(Continued)

OTHER PUBLICATIONS

First Office Action for Chinese Application No. 202111673906.6, dated Mar. 23, 2023, 13 Pages.

(Continued)

*Primary Examiner* — Alicia Baturay
(74) *Attorney, Agent, or Firm* — BROOKS KUSHMAN P.C.

(57) ABSTRACT

A message processing method and apparatus. The method includes: receiving a first message and related information of the first message, where the related information includes identification information of a sender of the first message and group identification information of a target instant messaging group; and prompting the first message in a case that the first message matches a second message, where the second message is a historical message in the target instant messaging group.

12 Claims, 13 Drawing Sheets

(56) References Cited

U.S. PATENT DOCUMENTS

| | | | | |
|---|---|---|---|---|
| 10,826,851 | B2 * | 11/2020 | Ergen | H04L 51/02 |
| 10,904,379 | B2 * | 1/2021 | Ko | H04M 1/72457 |
| 11,019,000 | B2 * | 5/2021 | Klemm | H04L 51/02 |
| 11,121,997 | B1 * | 9/2021 | Zhao | H04L 51/18 |
| 11,178,087 | B2 * | 11/2021 | Narayanswamy | H04L 51/216 |
| 11,316,817 | B1 * | 4/2022 | Rao | G06F 21/10 |
| 11,411,900 | B2 * | 8/2022 | Boyd | G06F 3/04817 |
| 11,652,768 | B2 * | 5/2023 | Zhao | G06F 40/30 709/206 |
| 11,790,324 | B2 * | 10/2023 | Chen | G06F 3/0482 455/418 |
| 12,100,035 | B2 * | 9/2024 | Yang | G06F 40/134 |
| 12,124,488 | B1 * | 10/2024 | Rozenbaum | G06F 16/334 |
| 12,375,601 | B2 * | 7/2025 | Ko | H04M 1/72454 |
| 2005/0148372 | A1 * | 7/2005 | Lowinger | H04M 1/72439 455/566 |
| 2006/0031335 | A1 * | 2/2006 | Carey | G06Q 10/107 709/206 |
| 2015/0142897 | A1 | 5/2015 | Alten et al. | |
| 2015/0163341 | A1 * | 6/2015 | Skovron | H04M 1/72454 455/418 |
| 2024/0103685 | A1 * | 3/2024 | Pazmino | G06F 3/011 |
| 2024/0103686 | A1 * | 3/2024 | Pazmino | G06F 3/011 |
| 2024/0233288 | A1 * | 7/2024 | Stauber | A63F 13/213 |
| 2025/0280045 | A1 * | 9/2025 | Bradley | H04L 65/1069 |

FOREIGN PATENT DOCUMENTS

| | | | |
|---|---|---|---|
| CN | 110149265 | A | 8/2019 |
| CN | 111432067 | A | 7/2020 |
| CN | 112398725 | A | 2/2021 |
| CN | 112910754 | A | 6/2021 |
| CN | 113839789 | A | 12/2021 |
| CN | 114095467 | A | 2/2022 |

OTHER PUBLICATIONS

International Search Report and Written Opinion for Application No. PCT/CN2022/143765, dated Mar. 24, 2023, 14 Pages.

* cited by examiner

INSTANT MESSAGING GROUP MESSAGE PROCESSING METHOD AND APPARATUS

CROSS-REFERENCE TO RELATED APPLICATION

This application is a continuation of International Application No. PCT/CN2022/143765 filed on Dec. 30, 2022, which claims priority to Chinese Patent Application No. 202111673906.6 filed on Dec. 31, 2021, which are incorporated herein by reference in their entireties.

TECHNICAL FIELD

This application pertains to the field of message processing technologies, and specifically to a message processing method and apparatus.

BACKGROUND

Currently, more and more IM (Instant Messaging) software is put into use. In daily life, to deliver messages in batches, corresponding groups, such as work groups, family groups, and community groups, are generally set up in the IM type software, so that messages that need to be known to users are sent to each member in the groups in a form of group messages.

However, with an increasing quantity of group messages, the members in the groups may be prone to missing messages, affecting a processing rate of the messages in the groups.

SUMMARY

An objective of embodiments of this application is to provide a message processing method and apparatus.

According to a first aspect, an embodiment of this application provides a message processing method applied to an electronic device. The method includes:

receiving a first message and related information of the first message, where the related information includes identification information of a sender of the first message and group identification information of a target instant messaging group; and prompting the first message in a case that the first message matches a second message, where the second message is a historical message in the target instant messaging group.

According to a second aspect, an embodiment of this application provides a message processing method applied to a cloud. The method includes:

obtaining a first message;

determining identification information that is of a first user in a target instant messaging group and that satisfies a preset condition in a case that the first message matches a second message, where the second message is a historical message in the target instant messaging group; and sending the first message to an electronic device corresponding to the first user based on the identification information of the first user.

According to a third aspect, an embodiment of this application provides a message processing apparatus applied to an electronic device. The apparatus includes:

a receiving module, configured to receive a first message and related information of the first message, where the related information includes identification information of a sender of the first message and group identification information of a target instant messaging group; and a prompting module, configured to prompt the first message in a case that the first message matches a second message, where the second message is a historical message in the target instant messaging group.

According to a fourth aspect, an embodiment of this application provides a message processing apparatus applied to a cloud. The apparatus includes:

a second obtaining module, configured to obtain a first message;

a third determining module, configured to determine identification information that is of a first user in a target instant messaging group and that satisfies a preset condition in a case that the first message matches a second message, where the second message is a historical message in the target instant messaging group; and a first sending module, configured to send the first message to an electronic device corresponding to the first user based on the identification information of the first user.

According to a fifth aspect, an embodiment of this application provides an electronic device. The electronic device includes a processor, a memory, and a program or an instruction that is stored in the memory and that can run on the processor. When the program or the instruction is executed by the processor, steps of the message processing method according to the first aspect are implemented, or steps of the message processing method according to the second aspect are implemented.

According to a sixth aspect, an embodiment of this application provides a readable storage medium. The readable storage medium stores a program or an instruction, and when the program or the instruction is executed by a processor, steps of the message processing method according to the first aspect are implemented, or steps of the message processing method according to the second aspect are implemented.

According to a seventh aspect, an embodiment of this application provides a chip. The chip includes a processor and a communication interface, the communication interface is coupled to the processor, and the processor is configured to run a program or an instruction to implement steps of the message processing method according to the first aspect, or steps of the message processing method according to the second aspect.

According to an eighth aspect, an embodiment of this application provides a computer program product. The program product is stored in a storage medium, and the program product is executed by at least one processor to implement steps of the message processing method according to the first aspect, or steps of the message processing method according to the second aspect.

DETAILED DESCRIPTION

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in the specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

With reference to the accompanying drawings, the following describes in detail the message processing method in the embodiments of this application based on specific embodiments and application scenarios.

Figure 1:
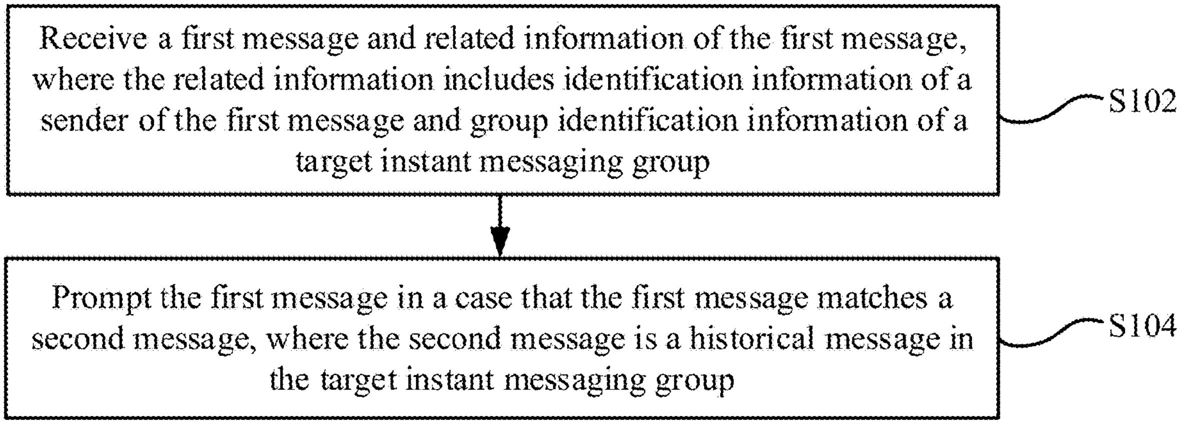
FIG. 1 is a first schematic flowchart of a message processing method according to an embodiment of this application.

FIG. 1 is a first schematic flowchart of a message processing method according to an embodiment of this application. The method is applied to an electronic device. As shown in FIG. 1, the message processing method may include the following steps.

S102: Receive a first message and related information of the first message, where the related information includes identification information of a sender of the first message and group identification information of a target instant messaging group.

The identification information of the sender may be account information of the sender, for example, a user ID (identity document) of the sender. The group identification information of the target instant messaging group may be group account information of the instant messaging group, for example, a group ID of the instant messaging group. The sender of the first message may be a member in the target instant messaging group.

S104: Prompt the first message in a case that the first message matches a second message, where the second message is a historical message in the target instant messaging group.

The electronic device may determine, based on information such as message content of the first message and a repeated sending identifier carried in the first message, that the first message matches the historical message in the target instant messaging group. The repeated sending identifier may be an identifier that is predefined and that indicates that a corresponding message is a repeatedly sent message.

Figure 2:
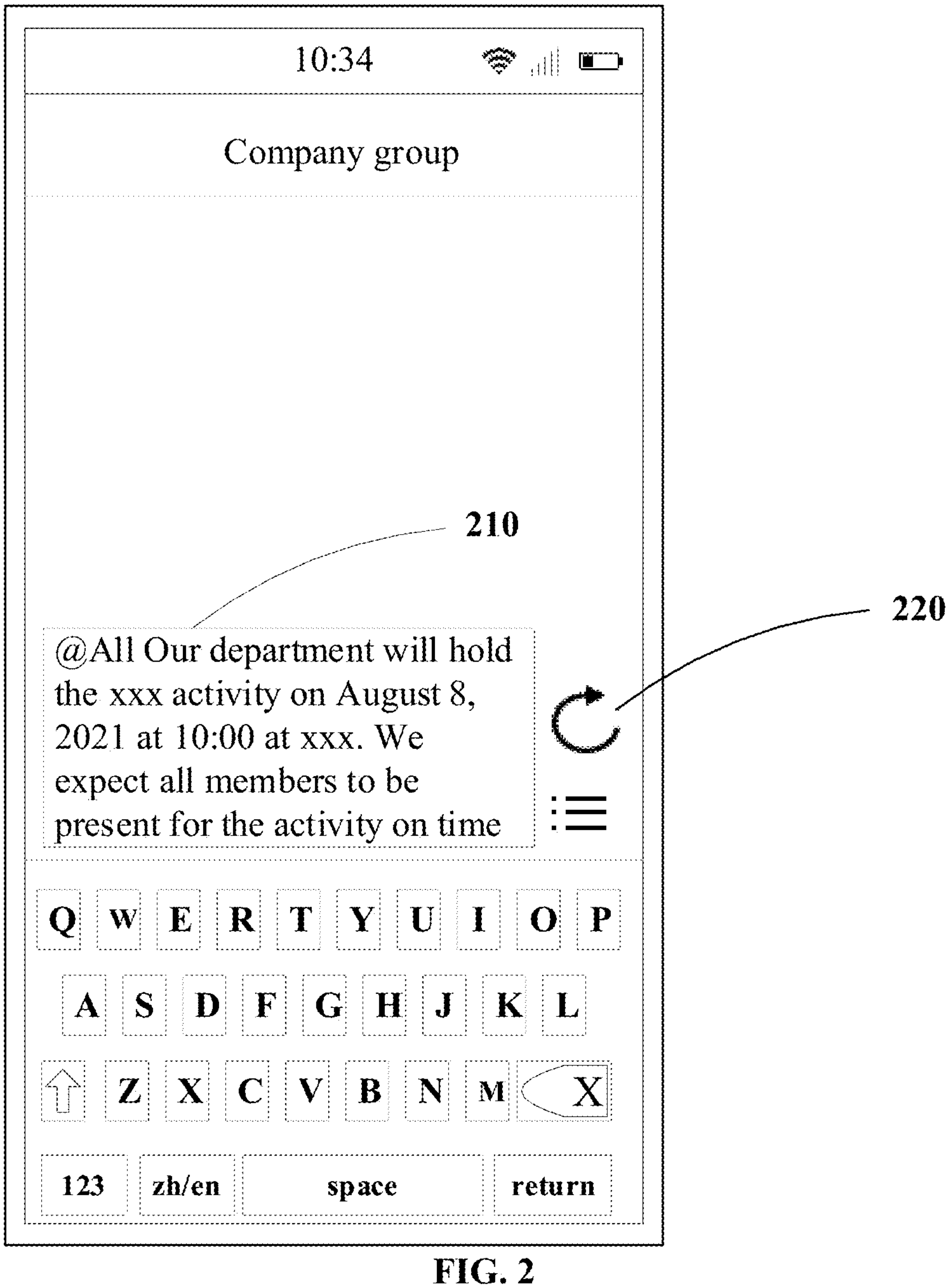
FIG. 2 is a schematic diagram of a message display interface according to an embodiment of this application.

For example, a user A needs to notify each member in a company group to meet at a specific time period. As shown in FIG. 2, the user A mentions (@) all members in the company group in IM type software, and edits the following message in a message input box 210: Our department will hold the xxx activity on Aug. 8, 2021 at 10:00 at xxx. We expect all members to be present for the activity on time. After clicking "Send", if the user A wants to repeatedly send the message, the user A may click an icon 220 for repeated message sending on the right side of the message input box 210. In this case, the message input box 210 displays a latest sent message, where the message may carry a repeated sending identifier. After clicking "Send", the electronic device can receive the message and the repeated sending identifier of the message, and determine that the message is a repeatedly sent message, that is, determine that the message matches a historical message in the company group.

In an embodiment, prompting the first message may be specifically performed by displaying the first message in an instant messaging interface corresponding to the target instant messaging group.

In this embodiment, prompting the first message may be further performed by: separately displaying the first message in an instant messaging interface between each member in the target instant messaging group and the sender of the first message; or displaying the first message in a pop-up window. In this case, even if each member in the target instant messaging group mutes the target instant messaging group, it can be ensured that each member receives the first message, thereby improving reachability of the first message. In a case that the first message matches the second message, the foregoing pop-up window pops up and is displayed on a screen of the electronic device.

The first message may not be prompted in a case that the first message matches the second message and the second message has been processed, thereby avoiding disturbing a user who has processed the second message.

In embodiments of this application, the electronic device receives the first message and the related information of the first message, where the related information includes the identification information of the sender of the first message and the group identification information of the target instant messaging group, to prompt the first message in a case that the first message matches the historical message in the target instant messaging group. It can be learned that the electronic device can determine, based on a received message and related information of the received message, whether the message is a duplicate message (that is, a message that matches the historical message in the target instant messaging group), and prompt the message in a case of determining that the message is the duplicate message, so that more members in the group can process the message, thereby effectively improving a processing rate of the message in the group.

Figure 3:
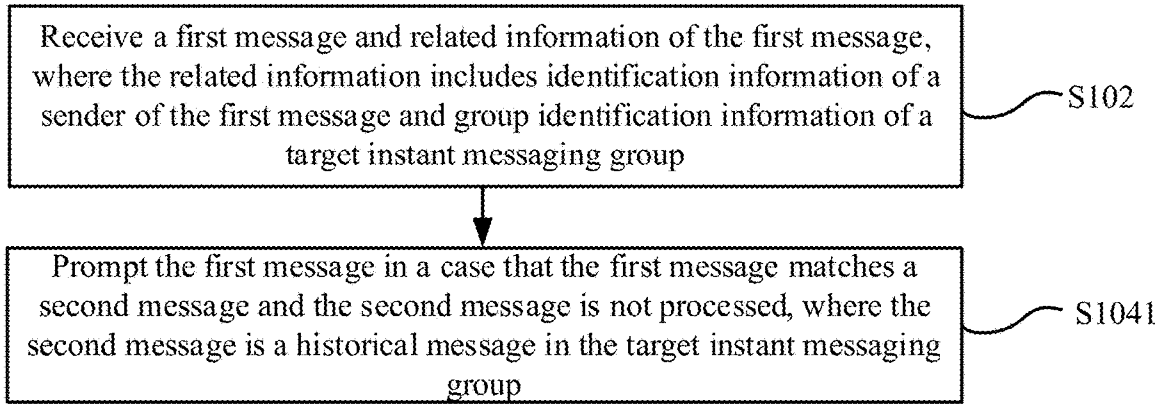
FIG. 3 is a second schematic flowchart of a message processing method according to an embodiment of this application.

In an embodiment, as shown in FIG. 3, S104 may be specifically performed as S1041: Prompt the first message in a case that the first message matches the second message and the second message is not processed.

In this embodiment, the electronic device prompts the first message in a case that the first message matches the second message (that is, the historical message in the target instant messaging group) and the second message is not processed, so that more members in the group can process the message, thereby effectively improving a processing rate of the message in the group.

Figure 4:
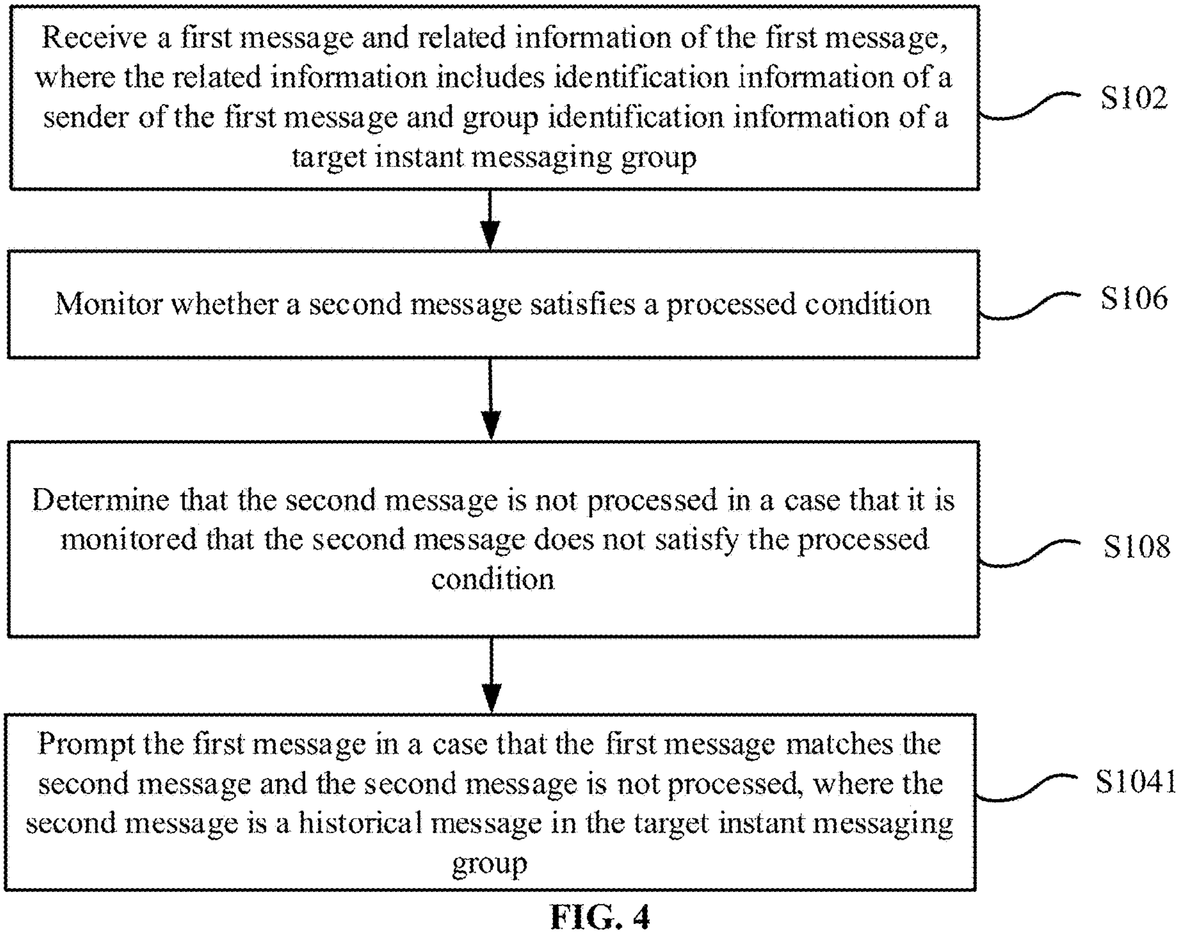
FIG. 4 is a third schematic flowchart of a message processing method according to an embodiment of this application.

In an embodiment, as shown in FIG. 4, before S1041 is performed, the following S106 to S108 may be used to determine whether the second message is processed.

S106: Monitor whether the second message satisfies a processed condition.

The processed condition includes at least one of the following: the second message is clicked, a processing status corresponding to the second message is processed, and display duration of the second message reaches preset duration.

In this embodiment, a clicked status of the second message may be recorded and stored by the electronic device.

In this embodiment, in a case of sending a message, the sender may set a read message condition corresponding to the message. Therefore, after the cloud sends the message to an electronic device corresponding to each member, the electronic device corresponding to each member determines a processing status and display duration of the message based on the read message condition carried in the message.

Figure 5:
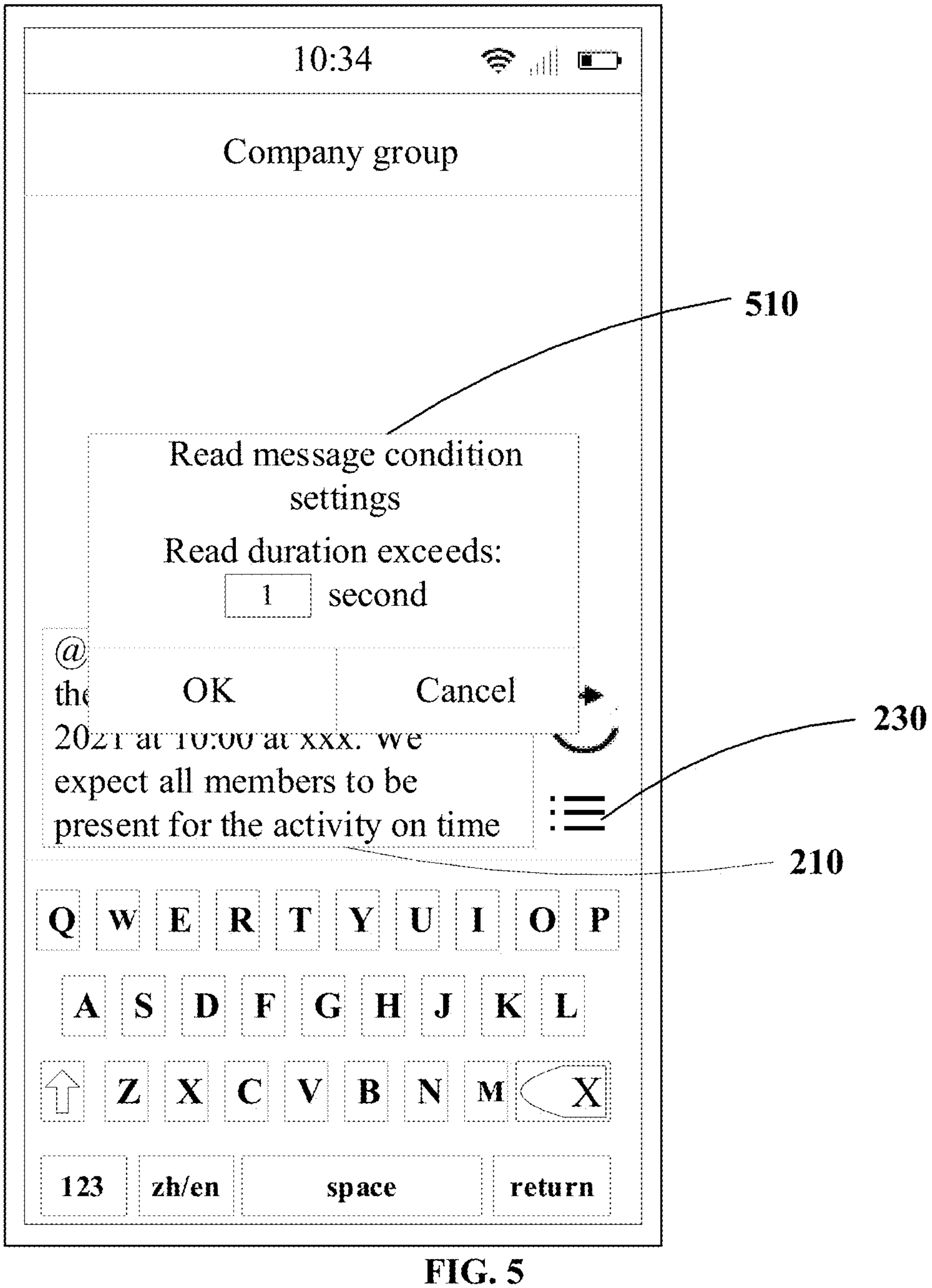
FIG. 5 is a schematic diagram of a setting interface for a read message condition according to an embodiment of this application.

The read message condition may be read duration (that is, the preset duration). Still refer to the example shown in FIG. 2. After the user A mentions (@) all the members in the company group in the IM type software, and edits the message in the message input box 210, the user A may click a setting icon 230 on the right side of the message input box 210. In this case, a current display interface is shown in FIG. 5. A pop-up window 510 is a setting window for the read message condition. The user may set, on the pop-up window 510, seconds that the read duration exceeds, for example, 1 second. Therefore, the electronic device corresponding to each member may determine, based on display duration of the message and with reference to the read message condition, that the user does not process the message in a case that the display duration is equal to 0; determine that the user has viewed the message in a case that the display duration is greater than 0 and is less than the read duration (that is, the preset duration) in the read message condition; or determine that the user has processed the message in a case that the display duration is greater than or equal to the read duration in the read message condition.

S108: Determine that the second message is not processed in a case that the second message is monitored to not satisfy the processed condition.

In addition, it is determined that the second message has been processed in a case that the second message is monitored to satisfy the processed condition.

In this embodiment, whether the second message satisfies the processed condition is monitored to determine whether the second message is processed, so that a determined processing status of the second message is more accurate, thereby facilitating accurate determining by the electronic device whether to prompt the first message.

Figure 6:
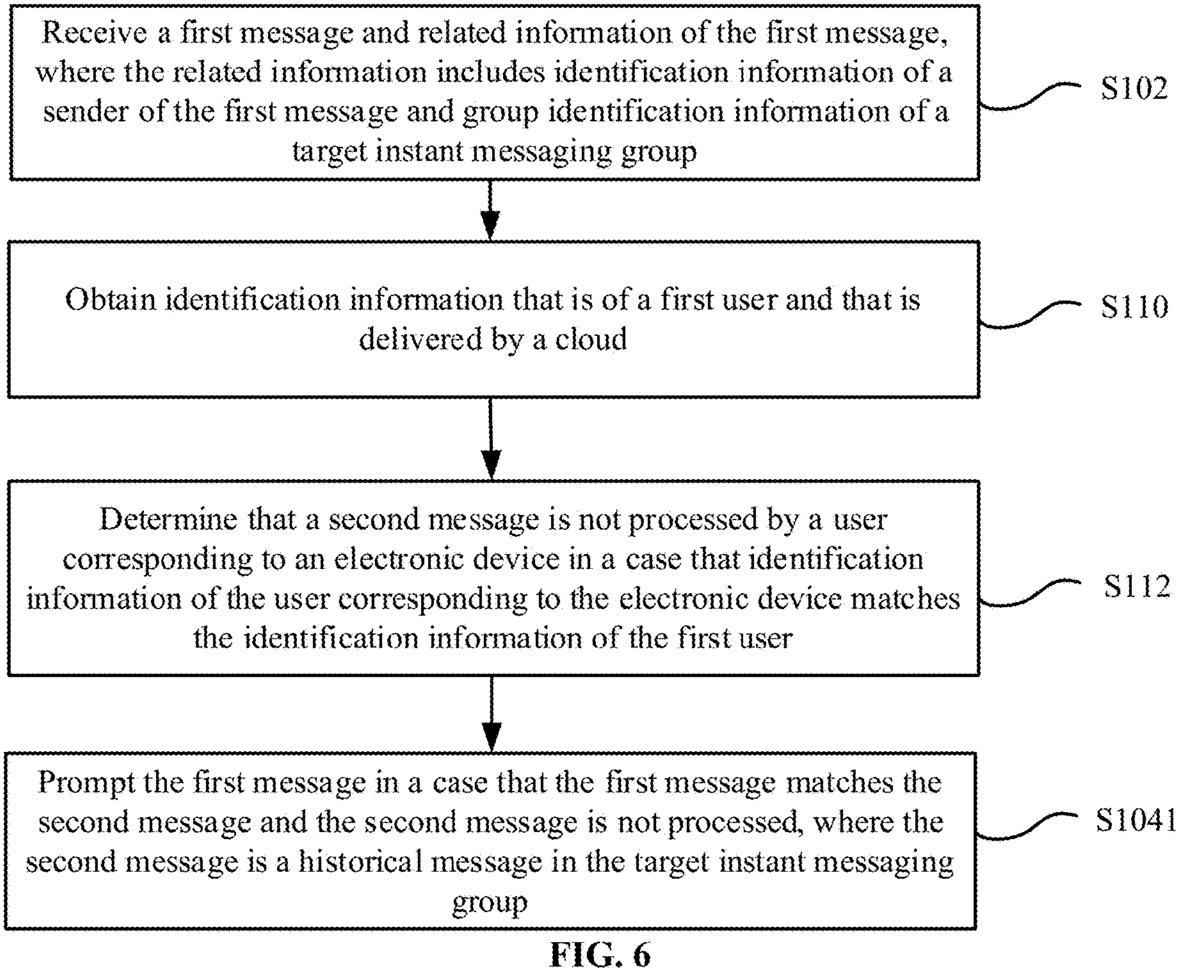
FIG. 6 is a fourth schematic flowchart of a message processing method according to an embodiment of this application.

In an embodiment, as shown in FIG. 6, before S1041 is performed, the following S110 to S112 may be used to determine whether the second message is processed.

S110: Obtain identification information that is of a first user and that is delivered by a cloud.

The first user is a user in the target instant messaging group who does not process the second message. The identification information of the first user may be account information of the first user, for example, a user ID of the first user.

Before S110 is performed, the cloud may obtain processing information of each member in the target instant messaging group for the second message, to determine a first user in the target instant messaging group who does not process the second message. Specific content of the processing information will be explained in detail in subsequent embodiments. Details are not described herein.

S112: Determine that the second message is not processed by a user corresponding to an electronic device in a case that identification information of the user corresponding to the electronic device matches the identification information of the first user.

In addition, it may be determined that the second message has been processed by the user corresponding to the electronic device in a case that the identification information of the user corresponding to the electronic device does not match the identification information of the first user.

In this embodiment, the identification information that is of the first user and that is delivered by the cloud is obtained, so that it is determined, based on a matching status between the identification information of the user corresponding to the electronic device and the identification information of the first user, whether the second message is processed by the user corresponding to the electronic device. Therefore, a determined processing status of the second message is more accurate, thereby facilitating accurate determining by the electronic device whether to prompt the first message.

Figure 7:
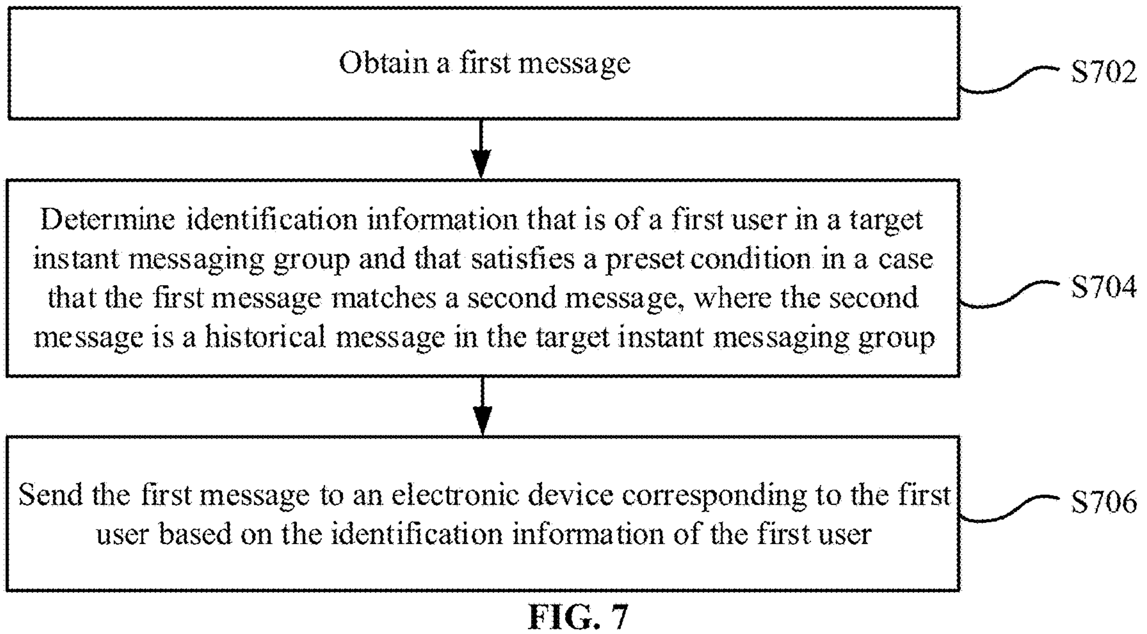
FIG. 7 is a fifth schematic flowchart of a message processing method according to an embodiment of this application.

FIG. 7 is a fifth schematic flowchart of a message processing method according to an embodiment of this application. The method is applied to a cloud. As shown in FIG. 7, the message processing method may include the following steps.

S702: Obtain a first message.

The first message is a message sent by a member in a target instant messaging group. In this embodiment, after the member in the target instant messaging group sends the first message in an instant messaging interface corresponding to the target instant messaging group, the cloud may obtain the first message.

S704: Determine identification information that is of a first user in the target instant messaging group and that satisfies a preset condition in a case that the first message matches a second message, where the second message is a historical message in the target instant messaging group.

The cloud may determine, based on information such as message content of the first message and a repeated sending identifier carried in the first message, that the first message matches the historical message in the target instant messaging group. The repeated sending identifier may be an identifier that is predefined and that indicates that a corresponding message is a repeatedly sent message. For detailed examples, refer to the related descriptions in S104. Details are not described herein.

The identification information of the first user may be account information of the first user, for example, a user ID of the first user.

S706: Send the first message to an electronic device corresponding to the first user based on the identification information of the first user.

In this embodiment of this application, the cloud obtains the first message, and determines the identification information that is of the first user in the target instant messaging group and that satisfies the preset condition in a case that the first message matches the historical message in the target instant messaging group, to send the first message to the electronic device corresponding to the first user based on the identification information of the first user. It can be learned that in this technical solution, the cloud can determine whether an obtained message is a duplicate message, and send the message to an electronic device corresponding to a user that is in a group and that satisfies the preset condition in a case of determining that the message is the duplicate message, so that more members in the group can process the message, thereby effectively improving a processing rate of the message in the group.

Figure 8:
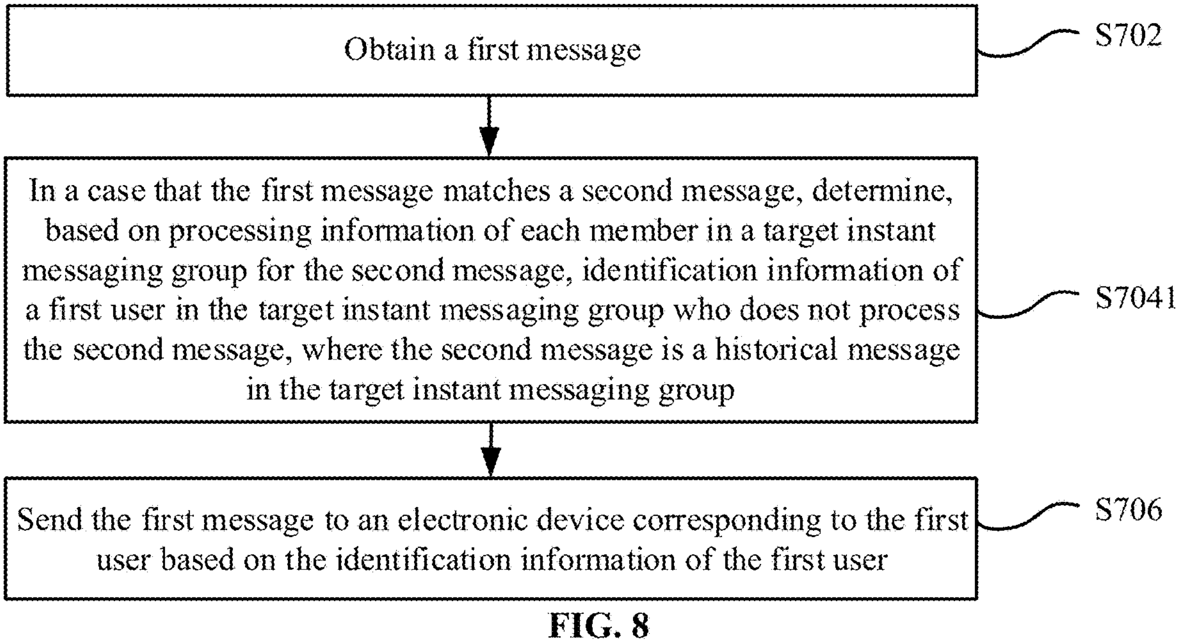
FIG. 8 is a sixth schematic flowchart of a message processing method according to an embodiment of this application.

In an embodiment, the preset condition may include not processing the second message. As shown in FIG. 8, S704 may be specifically performed as S7041: Determine, based on processing information of each member in the target instant messaging group for the second message, identification information of a first user in the target instant messaging group who does not process the second message.

The cloud may obtain the processing information of each member in the target instant messaging group for the second message. Specific content of the processing information will be explained in detail in subsequent embodiments. Details are not described herein.

The method in FIG. 8 may be applied to a plurality of scenarios, such as a scenario in which a group message is repeatedly sent and that an electronic device of a user who has processed the message repeatedly displays the message is avoided, and a scenario in which red packets are sent for a plurality of times and that a user who has grabbed a red packet repeatedly grabs another red packet is avoided. In a case that the method in FIG. 8 is applied to the scenario in which the red packets are sent for the plurality of times and that the user who has grabbed the red packet repeatedly grabs the another red packet is avoided. For example, a user A wants to send a 10-yuan red packet to each member in a company group, and the group has a total of 100 members. However, an IM type software has a limit for a red packet, and a maximum amount of the red packet is 200 yuan. In this case, to avoid a member who has grabbed a red packet from repeatedly grabbing another red packet, the user A may set a grab condition of a red packet in a case of sending the red packet for a second time to the plurality of times. The grab condition may be a condition such as a recipient of the red packet is not the same as a recipient of a previous red packet. After the red packet that carries the grab condition is sent, the cloud receives the red packet and the grab condition of the red packet, so that a first user in the target instant messaging group who does not grab the red packet can be determined based on the grab condition, and the red packet is sent to an electronic device corresponding to the first user based on identification information of the first user.

In this embodiment, the cloud determines, based on the processing information of each member in the target instant messaging group for the second message, the identification information of the first user in the target instant messaging group who does not process the second message, so that the first message can be sent to the electronic device corresponding to the first user based on the identification information of the first user. Therefore, a user whose currently does not process a to-be-sent duplicate message (that is, the first message) is determined in the cloud, so that the first message is sent to the electronic device corresponding to the user in a targeted manner, and more members in the group can process the message, thereby effectively improving a processing rate of the message in the group.

Figure 9:
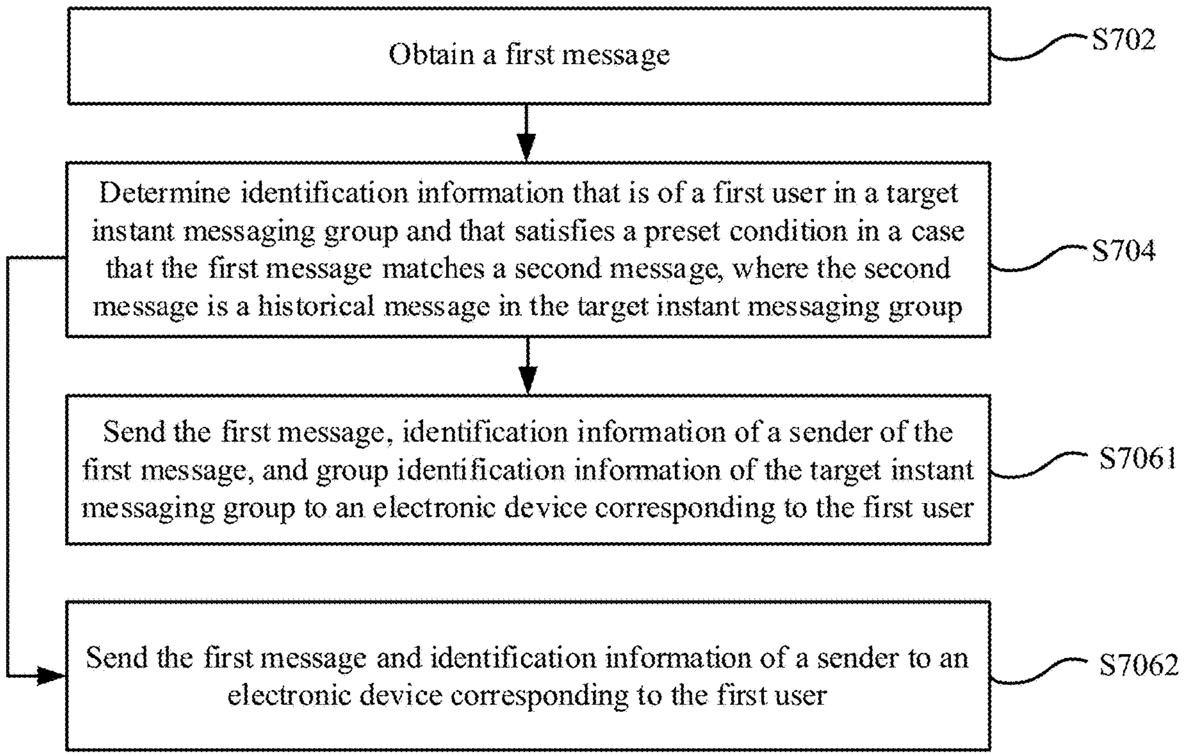
FIG. 9 is a seventh schematic flowchart of a message processing method according to an embodiment of this application.

In an embodiment, as shown in FIG. 9, the sending the first message to an electronic device corresponding to the first user based on the identification information of the first user (that is, S706) may be specifically performed as the following S7061 or S7062:

S7061: Send the first message, identification information of a sender of the first message, and group identification information of the target instant messaging group to the electronic device corresponding to the first user.

In this embodiment, the electronic device corresponding to the first user may determine, based on the received first message, the identification information of the sender of the first message, and the group identification information of the target instant messaging group, to display the first message in the instant messaging interface corresponding to the target instant messaging group.

S7062: Send the first message and identification information of a sender to the electronic device corresponding to the first user.

In this embodiment, the electronic device corresponding to the first user may determine, based on the received first message and the identification information of the sender, to display the first message in an instant messaging interface between the first user and the sender. In this case, even if the first user mutes the target instant messaging group, it can be ensured that the user receives the first message, thereby improving reachability of the first message.

Figure 10:
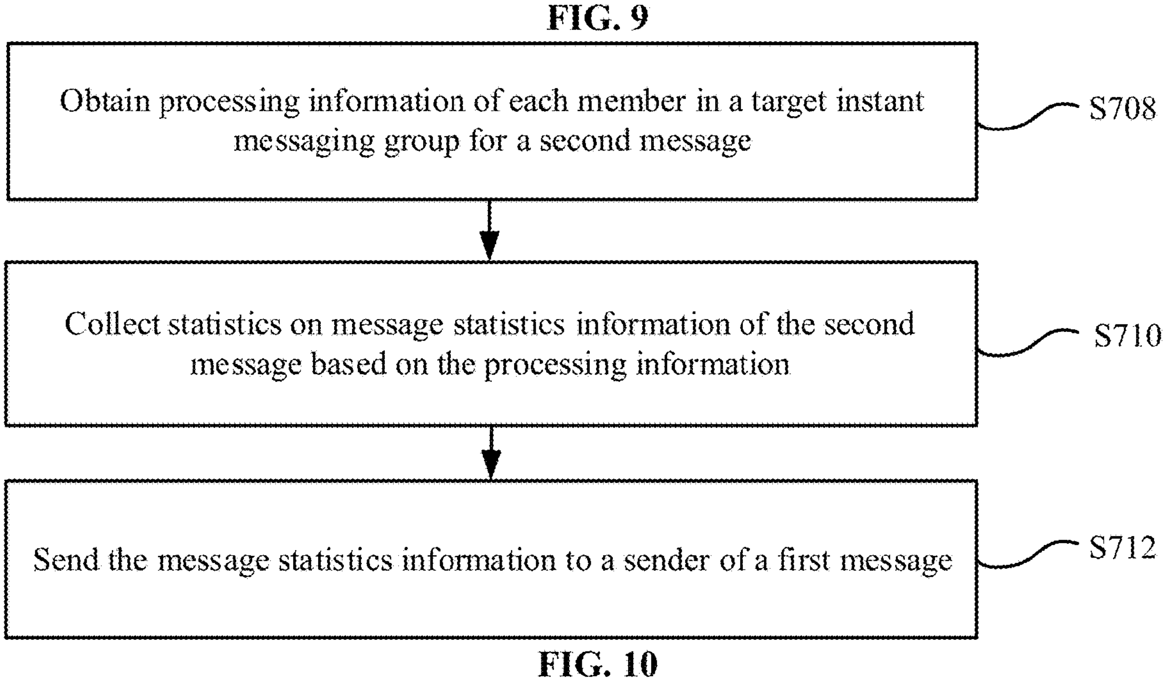
FIG. 10 is an eighth schematic flowchart of a message processing method according to an embodiment of this application.

In an embodiment, as shown in FIG. 10, the following S708 to S712 may be used to collect statistics on message statistics information of the second message based on the processing information of each member in the target instant messaging group for the second message, and send the message statistics information to the sender.

S708: Obtain the processing information of each member in the target instant messaging group for the second message.

The processing information may include the following: the group identification information of the target instant messaging group, and whether each member successfully receives the second message, identification information of a member who successfully receives the second message, identification information of a member who does not successfully receive the second message, whether each member has processed the second message, identification information of a member who has processed the second message, identification information of a member who does not process the second message, and the like.

In a case that the cloud sends the second message to the electronic device of each member, if the electronic device of each member feeds back that a message is successfully delivered, it may be determined that the electronic device successfully receives the second message; or if the electronic device of each member feeds back that a message fails to be delivered, it may be determined that the electronic device does not successfully receive the second message.

S710: Collect statistics on the message statistics information of the second message based on the processing information.

The message statistics information may include the following: a quantity of third users who successfully receive the second message, a proportion of the third users to the members, a quantity of fourth users who do not successfully receive the second message, a proportion of the fourth users to the members, a quantity of first users who do not process the second message, a proportion of the first users to the members, a quantity of second users who have processed the second message, a proportion of the second users to the members, and the like.

S712: Send the message statistics information to the sender of the first message.

Figure 11:
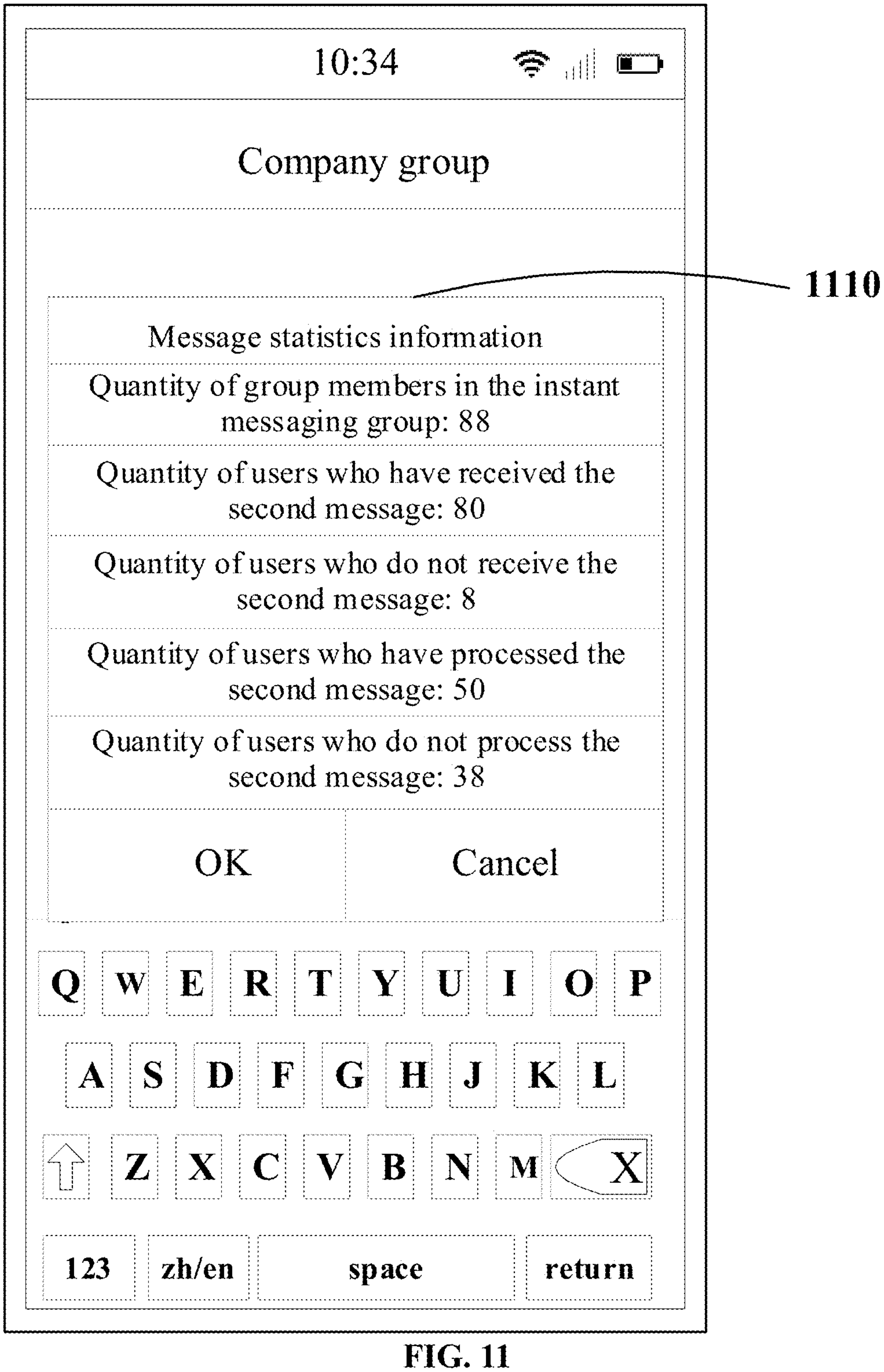
FIG. 11 is a schematic diagram of a display interface for message statistics information according to an embodiment of this application.

Optionally, after the message statistics information is sent to the sender, the message statistics information is displayed in a form of a pop-up window in an electronic device of the sender. For example, in a case that the message statistics information includes the following: a quantity of group members in the instant messaging group is 88, a quantity of users who have received the second message is 80, a quantity of users who do not receive the second message is 8, a quantity of users who have processed the second message is 50, and a quantity of users who do not process the second message is 38, a current interface of the IM type software in the electronic device of the sender may be shown in FIG. 11, where the message statistics information is displayed in a pop-up window 1110.

Optionally, the electronic device of the sender may automatically determine, based on the message statistics information and with reference to a preset repeated sending condition, whether to repeatedly send the message. The preset repeated sending condition may include the following: in a case that preset duration is reached after the second message is sent, the quantity of the first users who do not process the second message is greater than a first preset threshold, the quantity of the second users who have processed the second message is less than a second preset threshold, the proportion of the first users to the members is greater than a third preset threshold, the proportion of the second users to the members is less than a fourth preset threshold, the quantity of the third users who successfully receive the second message is less than a fifth preset threshold, the proportion of the third users to the members is less than a sixth preset threshold, the quantity of the fourth users who do not successfully receive the second message is greater than a seventh preset threshold, the proportion of the fourth users to the members is greater than an eighth preset threshold, and the like that is recorded in the message statistics information.

In this embodiment, a statistics occasion and a statistics frequency of the message statistics information, and a sending occasion and a sending frequency of sending the message statistics information to the sender may be preset in the cloud. Optionally, the statistics occasion of the message statistics information may be immediately collected after the second message is sent to the electronic device of each member, the statistics frequency may be collected in real time, the sending occasion may be after the preset duration after the second message is sent, and the sending frequency may be a preset frequency. If the second message carries a read message condition, the sending occasion may be set to after read duration in the read message condition, and the sending frequency may be set to once every read duration. This greatly reduces message statistics information of low reference value, so that the message statistics information sent to the sender can more accurately reflect an actual processing status of the second message by a user.

Figure 12:
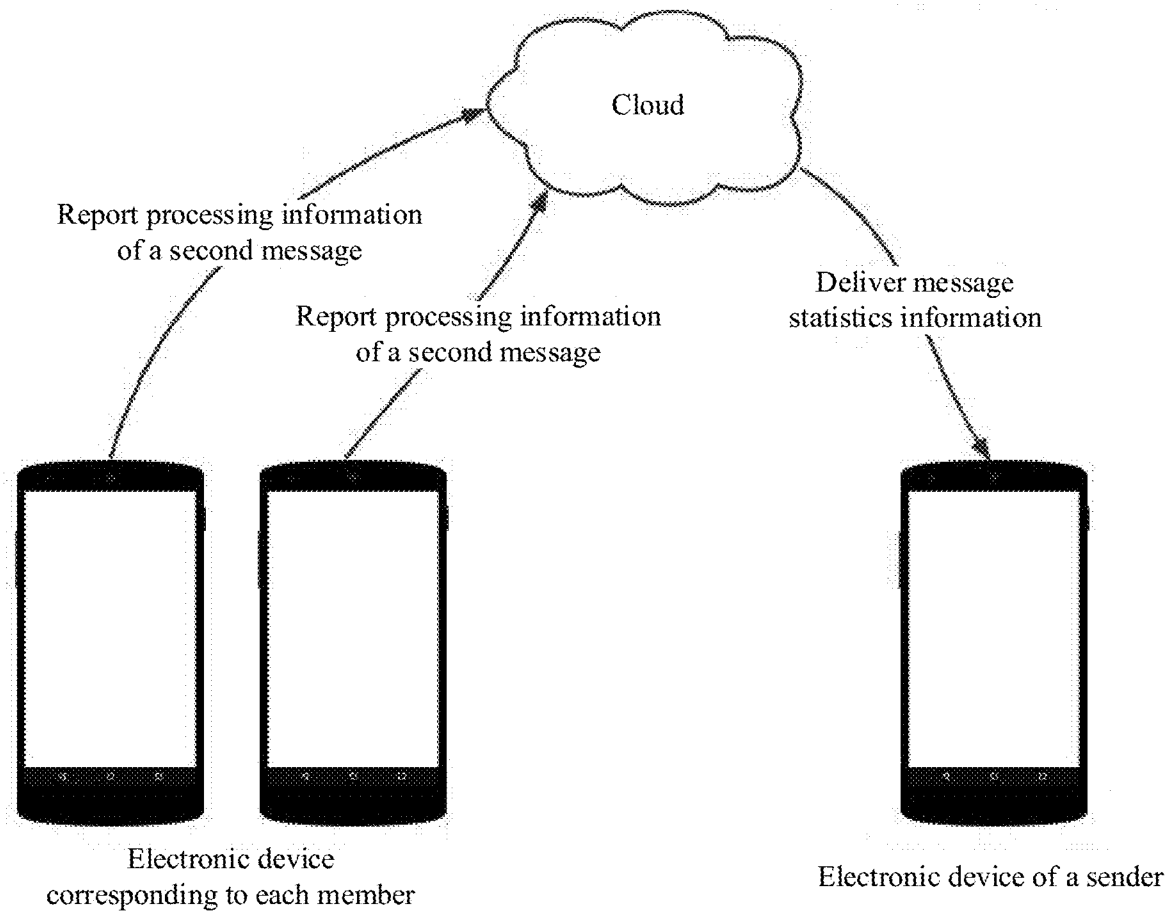
FIG. 12 is a schematic diagram of communication among a cloud, an electronic device of a sender, and an electronic device corresponding to each member according to an embodiment of this application.

According to the foregoing embodiment, a communication status between the cloud and the electronic device of the sender, and between the cloud and the electronic device corresponding to each member in the target instant messaging group may be shown in FIG. 12. The electronic device corresponding to each member reports the processing information of the second message to the cloud, and the cloud delivers the message statistics information to the electronic device of the sender.

In this embodiment, the cloud collects statistics on the message statistics information of the second message, and then sends the message statistics information to the sender, so that monitoring of processing information of a sent message is implemented. Therefore, the sender can determine, based on the message statistics information, whether to repeatedly send the message, so that more members in the group process the message, to provide a basis for improving a processing rate of the message in the group.

Figure 13:
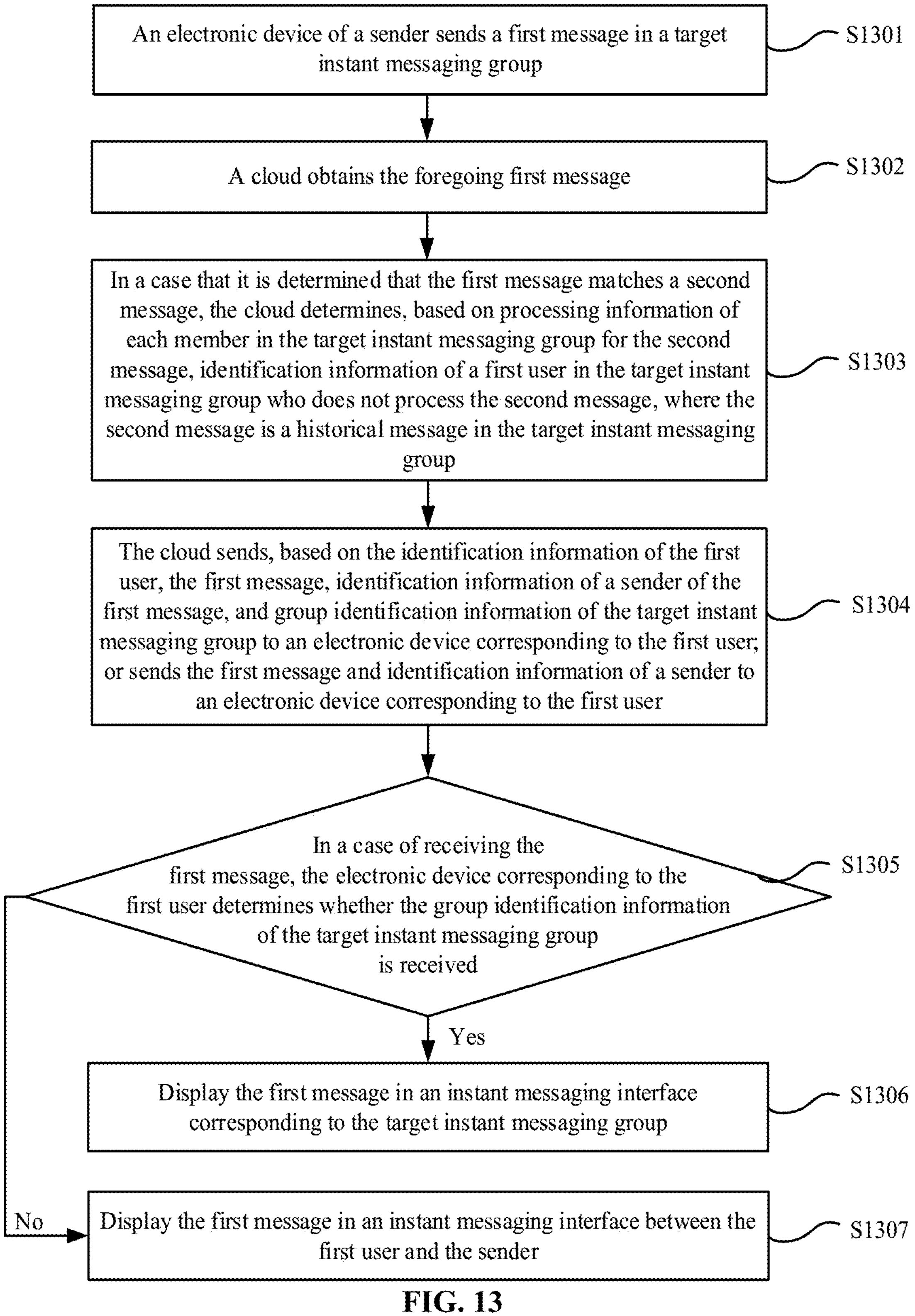
FIG. 13 is a ninth schematic flowchart of a message processing method according to an embodiment of this application.

To facilitate understanding of the message processing method provided in an embodiment of this application, the following describes the message processing method provided in the embodiment of this application in a manner of interaction between a cloud and an electronic device. For details, refer to FIG. 13 and FIG. 14. FIG. 13 is a ninth schematic flowchart of a message processing method according to an embodiment of this application. In this embodiment, the cloud may determine identification information of a first user in a target instant messaging group who does not process a second message (that is, a historical message in the target instant messaging group), and send the first message to an electronic device corresponding to the first user based on the identification information of the first user, so that the electronic device corresponding to the first user prompts the first message. As shown in FIG. 13, the message processing method may include the following steps.

S1301: An electronic device of a sender sends the first message in the target instant messaging group.

S1302: The cloud obtains the foregoing first message.

In this embodiment, before the first message is obtained, processing information of each member in the target instant messaging group for the second message may be further obtained. Message statistics information of the second message is collected based on the processing information, and the message statistics information is sent to the sender of the first message.

The second message is a historical message in the target instant messaging group. The processing information may include the group identification information of the target instant messaging group, and at least one of the following: whether each member successfully receives the second message, identification information of a member who successfully receives the second message, identification information of a member who does not successfully receive the second message, whether each member has processed the second message, identification information of a member who has processed the second message, and identification information of a member who does not process the second message. The message statistics information may include at least one of the following: a quantity of third users who successfully receive the second message, a proportion of the third users to the members, a quantity of fourth users who do not successfully receive the second message, a proportion of the fourth users to the members, a quantity of first users who do not process the second message, a proportion of the first users to the members, a quantity of second users who have processed the second message, and a proportion of the second users to the members.

S1303: In a case that it is determined that the first message matches the second message, the cloud determines, based on the processing information of each member in the target instant messaging group for the second message, the identification information of the first user in the target instant messaging group who does not process the second message. The second message is the historical message in the target instant messaging group.

S1304: The cloud sends, based on the identification information of the first user, the first message, identification information of the sender of the first message, and group identification information of the target instant messaging group to the electronic device corresponding to the first user; or sends the first message and identification information of the sender to the electronic device corresponding to the first user.

S1305: When receiving the first message, the electronic device corresponding to the first user determines whether the group identification information of the target instant messaging group is received; and if the group identification information of the target instant messaging group is received, S1306 is performed; or if the group identification information of the target instant messaging group is not received, S1307 is performed.

S1306: Display the first message in an instant messaging interface corresponding to the target instant messaging group.

S1307: Display the first message in an instant messaging interface between the first user and the sender.

A specific process of the foregoing S1301 to S1307 is described in detail in the foregoing embodiment. Details are not described herein again.

In this embodiment, a user who does not currently process a to-be-sent duplicate message (that is, the first message) is determined in the cloud, so that the first message is sent to an electronic device corresponding to the user in a targeted manner. This can avoid sending the first message to a user who has processed the second message, so that more members in the group can process the message, thereby effectively improving a processing rate of the message in the group.

Figure 14:
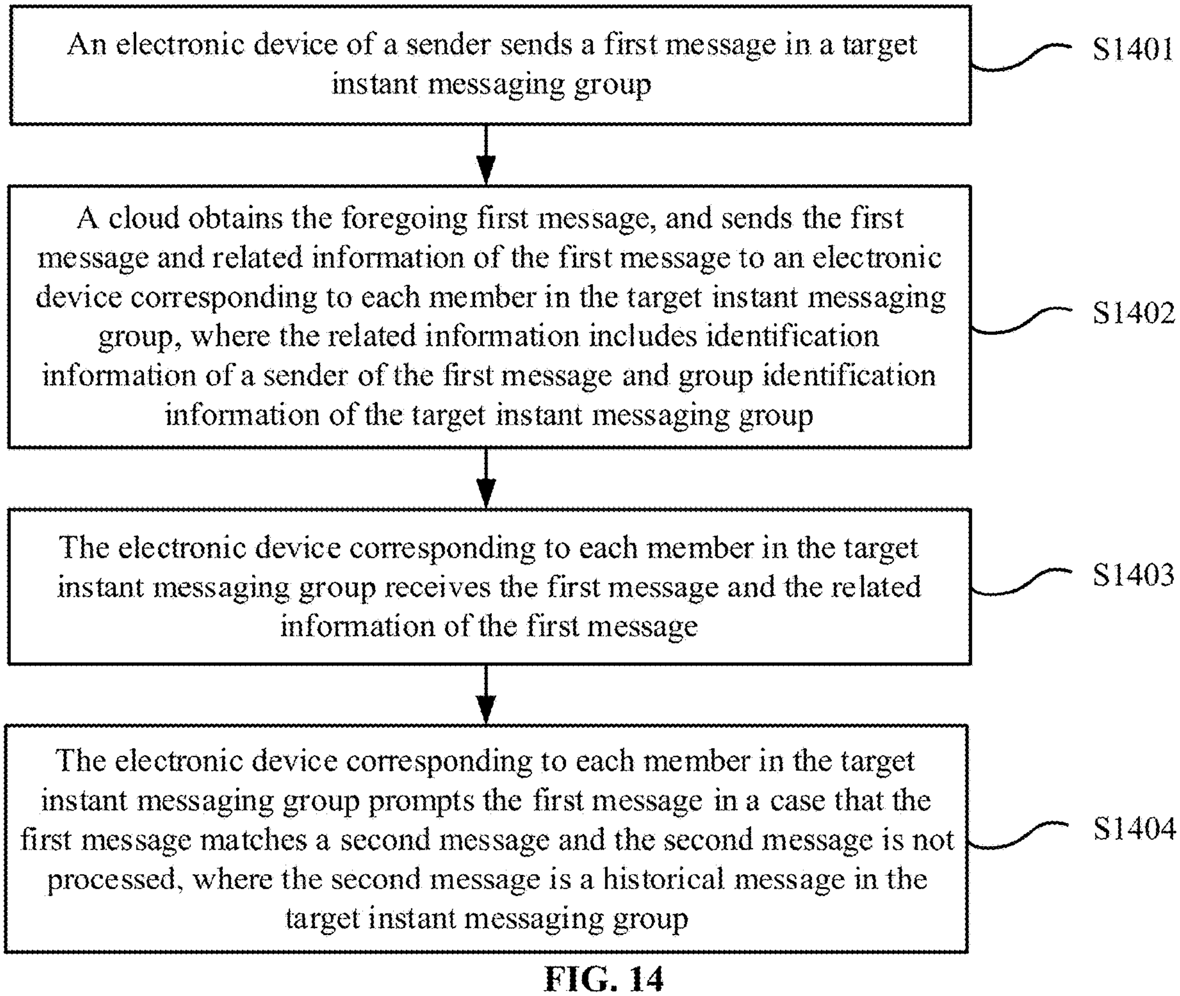
FIG. 14 is a tenth schematic flowchart of a message processing method according to an embodiment of this application.

FIG. 14 is a tenth schematic flowchart of a message processing method according to an embodiment of this application. In this embodiment, an electronic device corresponding to each member in a target instant messaging group can determine, based on a received message and related information of the received message, whether the message is a duplicate message (that is, a message that matches a historical message in the target instant messaging group), and prompt the message in a case of determining that the message is the duplicate message. As shown in FIG. 14, the message processing method may include the following steps.

S1401: An electronic device of a sender sends a first message in the target instant messaging group.

S1402: A cloud obtains the foregoing first message, and sends the first message and related information of the first message to the electronic device corresponding to each member in the target instant messaging group, where the related information includes identification information of the sender of the first message and group identification information of the target instant messaging group.

S1403: The electronic device corresponding to each member in the target instant messaging group receives the first message and the related information of the first message.

S1404: The electronic device corresponding to each member in the target instant messaging group prompts the first message in a case that the first message matches a second message and the second message is not processed, where the second message is the historical message in the target instant messaging group.

In this embodiment, before the first message is prompted in a case that the first message matches the second message and the second message is not processed, it may be monitored whether the second message satisfies a processed condition; and if the second message does not satisfy the processed condition, it is determined that the second message is not processed.

The processed condition may include at least one of the following: the second message is clicked, a processing status corresponding to the second message is processed, and display duration of the second message reaches preset duration.

In this embodiment, before the first message is prompted in a case that the first message matches the second message and the second message is not processed, identification information that is of a first user and that is delivered by the cloud may be obtained, so that it is determined that the second message is not processed by the user corresponding to the electronic device in a case that identification information of a user corresponding to an electronic device matches the identification information of the first user.

The first user is a user in the target instant messaging group who does not process the second message.

In this embodiment, prompting the first message may be specifically performed by: displaying the first message in an instant messaging interface corresponding to the target instant messaging group; separately displaying the first message in an instant messaging interface between each member in the target instant messaging group and the sender of the first message; or displaying the first message in a pop-up window.

A specific process of the foregoing S1401 to S1404 is described in detail in the foregoing embodiment. Details are not described herein again.

In this embodiment, the electronic device prompts the first message in a case that the first message matches the second message (that is, the historical message in the target instant messaging group) and the second message is not processed, so that it is avoided that the first message is prompted to a user who has processed the second message, and more members in the group can process the message, thereby effectively improving a processing rate of the message in the group.

The message processing method provided in this embodiment of this application may be executed by a message processing apparatus. In this embodiment of this application, an example in which the message processing apparatus performs the message processing method is used to describe the message processing apparatus provided in this embodiment of this application.

Figure 15:
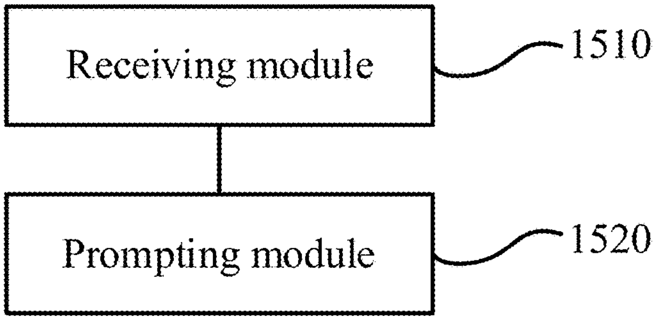
FIG. 15 is a first schematic diagram of a structure of a message processing apparatus according to an embodiment of this application.

FIG. 15 is a first schematic diagram of a structure of a message processing apparatus according to an embodiment of this application. The apparatus is applied to an electronic device. Refer to FIG. 15. The message processing apparatus may include:

- a receiving module 1510, configured to receive a first message and related information of the first message, where the related information includes identification information of a sender of the first message and group identification information of a target instant messaging group; and
- a prompting module 1520, configured to prompt the first message in a case that the first message matches a second message, where the second message is a historical message in the target instant messaging group.

In an embodiment, the prompting module 1520 includes:

- a prompting unit, configured to prompt the first message in a case that the first message matches the second message and the second message is not processed.

In an embodiment, the message processing apparatus further includes:

- a monitoring module, configured to monitor whether the second message satisfies a processed condition, where the processed condition includes at least one of the following: the second message is clicked, a processing status corresponding to the second message is processed, and display duration of the second message reaches preset duration; and
- a first determining module, configured to determine that the second message is not processed in a case that the second message does not satisfy the processed condition.

In an embodiment, the message processing apparatus further includes:

- a first obtaining module, configured to obtain identification information that is of a first user and that is delivered by a cloud, where the first user is a user in the target instant messaging group who does not process the second message; and
- a second determining module, configured to determine that the second message is not processed by a user corresponding to the electronic device in a case that identification information of the user corresponding to the electronic device matches the identification information of the first user.

In an embodiment, the prompting module 1520 includes:

- a display unit, configured to display the first message in an instant messaging interface corresponding to the target instant messaging group.

In this embodiment of this application, the electronic device receives the first message and the related information of the first message, where the related information includes the identification information of the sender of the first message and the group identification information of the target instant messaging group, to prompt the first message in a case that the first message matches the historical message in the target instant messaging group. It can be learned that the electronic device can determine, based on a received message and related information of the received message, whether the message is a duplicate message (that is, a message that matches the historical message in the target instant messaging group), and prompt the message in a case of determining that the message is the duplicate message, so that more members in the group can process the message, thereby effectively improving a processing rate of the message in the group.

Figure 16:
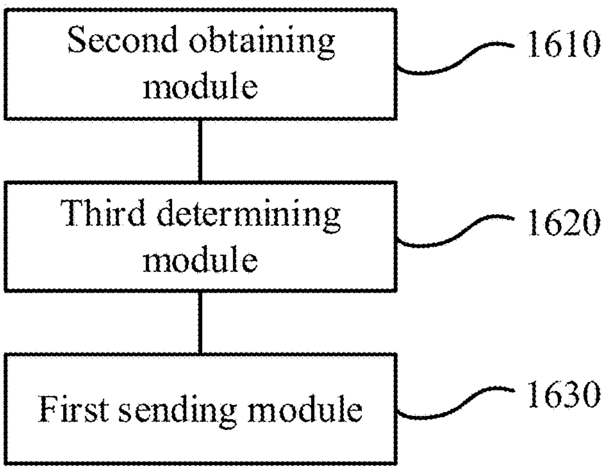
FIG. 16 is a second schematic diagram of a structure of a message processing apparatus according to an embodiment of this application.

FIG. 16 is a second schematic diagram of a structure of a message processing apparatus according to an embodiment of this application. The apparatus is applied to a cloud. Refer to FIG. 16. The message processing apparatus may include:

- a second obtaining module 1610, configured to obtain a first message;
- a third determining module 1620, configured to determine identification information that is of a first user in a target instant messaging group and that satisfies a preset condition in a case that the first message matches a second message, where the second message is a historical message in the target instant messaging group; and
- a first sending module 1630, configured to send the first message to an electronic device corresponding to the first user based on the identification information of the first user.

In an embodiment, the preset condition includes not processing the second message.

The third determining module 1620 includes:

- a determining unit, configured to determine, based on processing information of each member in the target instant messaging group for the second message, identification information of a first user in the target instant messaging group who does not process the second message.

In an embodiment, the first sending module 1630 includes:

- a first sending unit, configured to send the first message, identification information of a sender of the first message, and group identification information of the target instant messaging group to the electronic device corresponding to the first user; or
- a second sending unit, configured to send the first message and identification information of a sender to the electronic device corresponding to the first user.

In an embodiment, the message processing apparatus further includes:

- a third obtaining module, configured to obtain processing information of each member in the target instant messaging group for the second message, where the processing information includes group identification information of the target instant messaging group, and at least one of the following: whether each member successfully receives the second message, identification information of a member who successfully receives the second message, identification information of a member who does not successfully receive the second message, whether each member has processed the second message, identification information of a member who has processed the second message, and identification information of a member who does not process the second message;
- a statistics module, configured to collect statistics on message statistics information of the second message based on the processing information, where the message statistics information includes at least one of the following: a quantity of third users who successfully receive the second message, a proportion of the third users to the members, a quantity of fourth users who do not successfully receive the second message, a proportion of the fourth users to the members, a quantity of first users who do not process the second message, a proportion of the first users to the members, a quantity of second users who have processed the second message, and a proportion of the second users to the members; and a second sending module, configured to send the message statistics information to a sender of the first message.

In this embodiment of this application, the cloud obtains the first message, and determines the identification information that is of the first user in the target instant messaging group and that satisfies the preset condition in a case that the first message matches the historical message in the target instant messaging group, to send the first message to the electronic device corresponding to the first user based on the identification information of the first user. It can be learned that in this technical solution, the cloud can determine whether an obtained message is a duplicate message, and send the message to an electronic device corresponding to a user that is in a group and that satisfies the preset condition in a case of determining that the message is the duplicate message, so that more members in the group can process the message, thereby effectively improving a processing rate of the message in the group.

The message processing apparatus in this embodiment of this application may be an electronic device, or may be a component such as a circuit or a chip in the electronic device. The electronic device may be a terminal, or another device other than the terminal. For example, the electronic device may be a mobile phone, a tablet computer, a notebook computer, a palmtop computer, an in-vehicle electronic device, a mobile Internet device (MID), an augmented reality (AR)/virtual reality (VR) device, a robot, a wearable device, an ultra-mobile personal computer (UMPC), a netbook, a personal digital assistant (PDA), or the like. The electronic device may alternatively be a server, a network attached storage (NAS), a personal computer (PC), a television (TV), a teller machine, a self-service machine, or the like. This is not specifically limited in embodiments of this application.

The message processing apparatus in the embodiments of this application may be an apparatus with an operating system. The operating system may be an Android operating system, an iOS operating system, or another possible operating system. This is not specifically limited in embodiments of this application.

The message processing apparatus provided in this embodiment of this application can implement processes implemented in the embodiments of the message processing method in FIG. 1 to FIG. 14. To avoid repetition, details are not described herein again.

Figure 17:
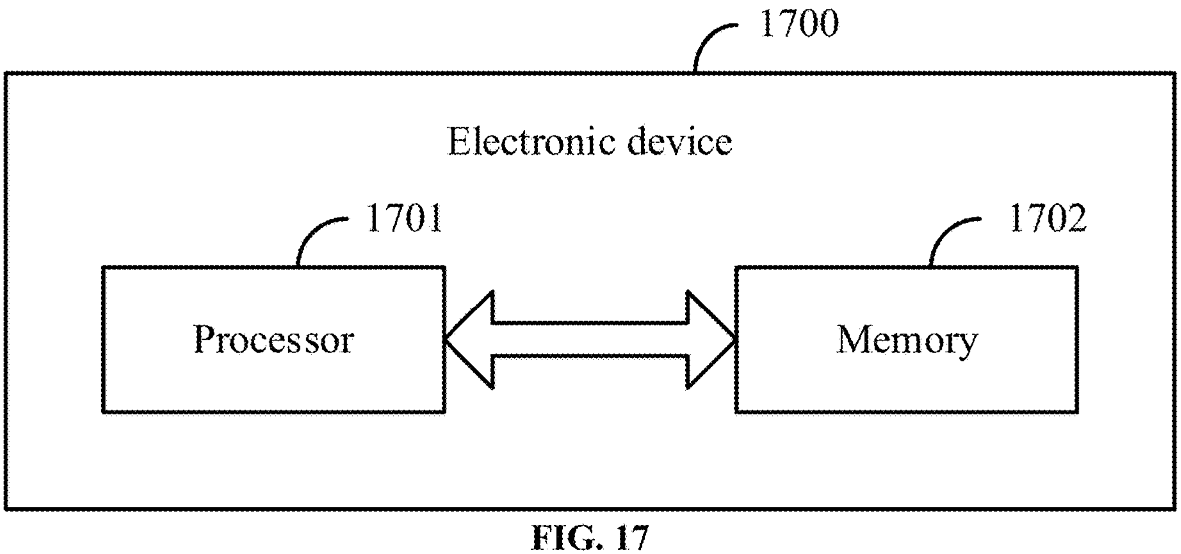
FIG. 17 is a schematic diagram of a structure of an electronic device according to an embodiment of this application.

Optionally, as shown in FIG. 17, an embodiment of this application further provides an electronic device 1700, including a processor 1701 and a memory 1702. The memory 1702 stores a program or an instruction that can run on the processor 1701. When the program or the instruction is executed by the processor 1701, steps of the foregoing embodiments of the message processing method applied to the electronic device are implemented and a same technical effect can be achieved. To avoid repetition, details are not described herein again.

Optionally, in the electronic device 1700 shown in FIG. 17, in a case that the program or the instruction stored in the memory 1702 is executed by the processor 1701, processes in the foregoing embodiments of the message processing method applied to the cloud are implemented and a same technical effect can be achieved. To avoid repetition, details are not described herein again.

It should be noted that the electronic device in this embodiment of this application includes the foregoing terminal, the cloud, and another device other than the terminal and the cloud.

Figure 18:
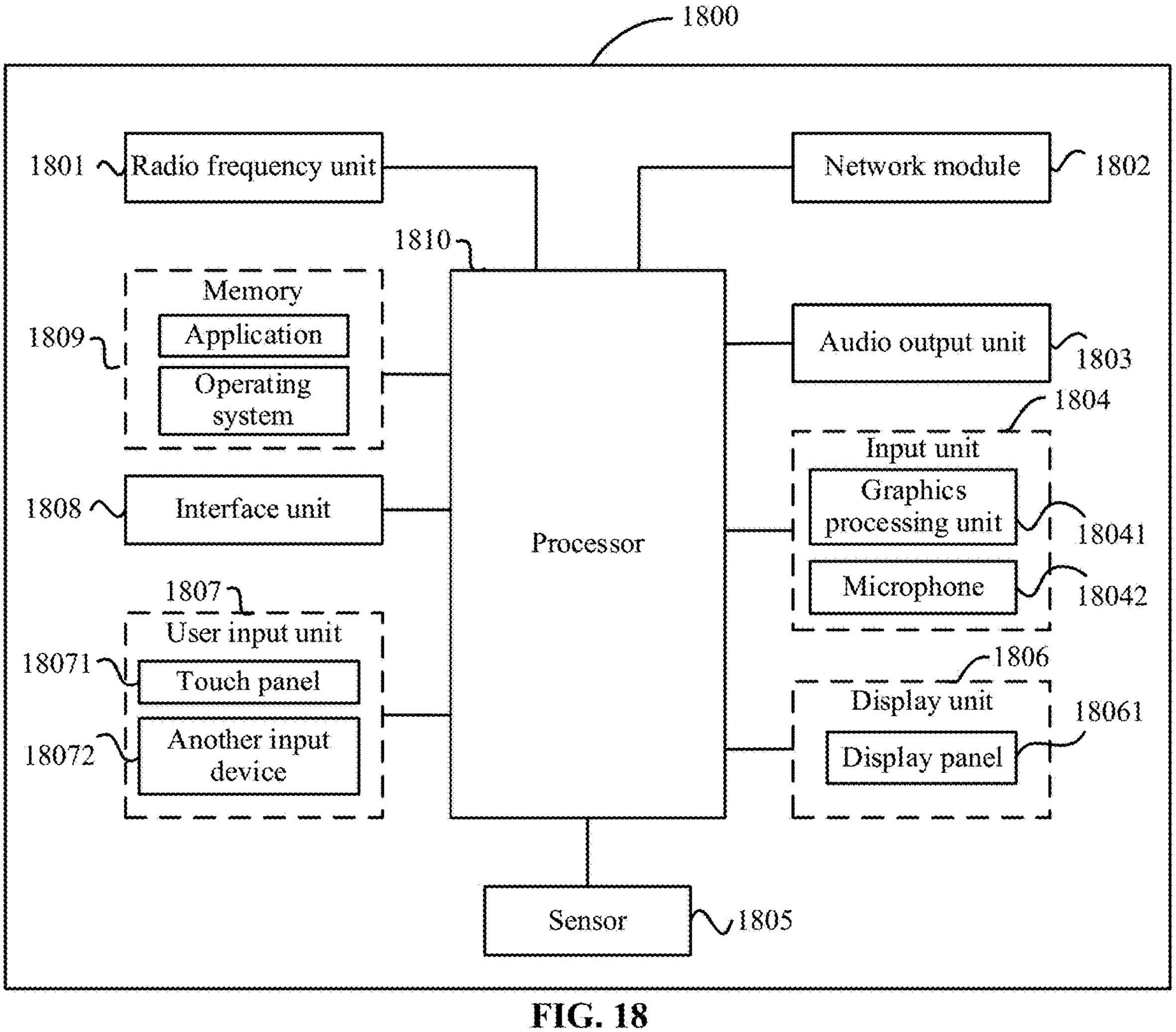
FIG. 18 is a schematic diagram of a hardware structure of an electronic device according to an embodiment of this application.

FIG. 18 is a schematic diagram of a hardware structure of an electronic device according to an embodiment of this application.

An electronic device 1800 includes but is not limited to components such as a radio frequency unit 1801, a network module 1802, an audio output unit 1803, an input unit 1804, a sensor 1805, a display unit 1806, a user input unit 1807, an interface unit 1808, a memory 1809, and a processor 1810.

A person skilled in the art can understand that the electronic device 1800 may further include a power supply (such as a battery) that supplies power to each component. The power supply may be logically connected to the processor 1810 by using a power supply management system, to implement functions such as charging and discharging management, and power consumption management by using the power supply management system. The structure of the electronic device shown in FIG. 18 does not constitute a limitation on the electronic device. The electronic device may include components more or fewer than those shown in the diagram, a combination of some components, or different component arrangements. Details are not described herein.

In an embodiment, the processor 1810 is configured to: receive a first message and related information of the first message, where the related information includes identification information of a sender of the first message and group identification information of a target instant messaging group; and prompt the first message in a case that the first message matches a second message, where the second message is a historical message in the target instant messaging group.

Optionally, the processor 1810 is further configured to prompt the first message in a case that the first message matches the second message and the second message is not processed.

Optionally, the processor 1810 is further configured to: before the first message is prompted in a case that the first message matches the second message and the second message is not processed, monitor whether the second message satisfies a processed condition, where the processed condition includes at least one of the following: the second message is clicked, a processing status corresponding to the second message is processed, and display duration of the second message reaches preset duration; and if the second message does not satisfy the processed condition, it is determined that the second message is not processed.

Optionally, the processor 1810 is further configured to: before the first message is prompted in a case that the first message matches the second message and the second message is not processed, obtain identification information that is of a first user and that is delivered by a cloud, where the first user is a user in the target instant messaging group who does not process the second message; and determine that the second message is not processed by a user corresponding to the electronic device in a case that identification information of the user corresponding to the electronic device matches the identification information of the first user.

Optionally, the processor 1810 is further configured to display the first message in an instant messaging interface corresponding to the target instant messaging group.

In this embodiment of this application, the electronic device receives the first message and the related information of the first message, where the related information includes the identification information of the sender of the first message and the group identification information of the target instant messaging group, to prompt the first message in a case that the first message matches the historical message in the target instant messaging group. It can be learned that the electronic device can determine, based on a received message and related information of the received message, whether the message is a duplicate message (that is, a message that matches the historical message in the target instant messaging group), and prompt the message in a case of determining that the message is the duplicate message, so that more members in the group can process the message, thereby effectively improving a processing rate of the message in the group.

In an embodiment, the processor 1810 is configured to: obtain a first message; determine identification information that is of a first user in a target instant messaging group and that satisfies a preset condition in a case that the first message matches a second message, where the second message is a historical message in the target instant messaging group; and send the first message to an electronic device corresponding to the first user based on the identification information of the first user.

Optionally, the preset condition includes not processing the second message. The processor 1810 is further configured to determine, based on processing information of each member in the target instant messaging group for the second message, identification information of a first user in the target instant messaging group who does not process the second message.

Optionally, the processor 1810 is further configured to: send the first message, identification information of the sender of the first message, and group identification information of the target instant messaging group to the electronic device corresponding to the first user; or send the first message and identification information of the sender to the electronic device corresponding to the first user.

Optionally, the processor 1810 is further configured to: obtain processing information of each member in the target instant messaging group for the second message, where the processing information includes group identification information of the target instant messaging group, and at least one of the following: whether each member successfully receives the second message, identification information of a member who successfully receives the second message, identification information of a member who does not successfully receive the second message, whether each member has processed the second message, identification information of a member who has processed the second message, and identification information of a member who does not process the second message; collect statistics on message statistics information of the second message based on the processing information, where the message statistics information includes at least one of the following: a quantity of third users who successfully receive the second message, a proportion of the third users to the members, a quantity of fourth users who do not successfully receive the second message, a proportion of the fourth users to the members, a quantity of first users who do not process the second message, a proportion of the first users to the members, a quantity of second users who have processed the second message, and a proportion of the second users to the members; and send the message statistics information to the sender of the first message.

In this embodiment of this application, the cloud obtains the first message, and determines the identification information that is of the first user in the target instant messaging group and that satisfies the preset condition in a case that the first message matches the historical message in the target instant messaging group, to send the first message to the electronic device corresponding to the first user based on the identification information of the first user. It can be learned that in this technical solution, the cloud can determine whether an obtained message is a duplicate message, and send the message to an electronic device corresponding to a user that is in a group and that satisfies the preset condition in a case of determining that the message is the duplicate message, so that more members in the group can process the message, thereby effectively improving a processing rate of the message in the group.

It should be understood that in this embodiment of this application, the input unit 1804 may include a graphics processing unit (GPU) 18041 and a microphone 18042. The graphics processing unit 18041 processes image data of a static picture or a video obtained by an image capture apparatus (for example, a camera) in a video capture mode or an image capture mode. The display unit 1806 may include a display panel 18061. Optionally, the display panel 18061 may be configured in a form such as a liquid crystal display or an organic light-emitting diode. The user input unit 1807 includes at least one of a touch panel 18071 and another input device 18072. The touch panel 18071 is also referred to as a touchscreen. The touch panel 18071 may include two parts: a touch detection apparatus and a touch controller. The another input device 18072 may include but is not limited to a physical keyboard, a functional button (such as a volume control button or a power on/off button), a trackball, a mouse, and a joystick. Details are not described herein.

The memory 1809 may be configured to store a software program and various data. The memory 1809 may mainly include a first storage area for storing a program or an instruction and a second storage area for storing data. The first storage area may store an operating system, and an application or an instruction required by at least one function (for example, a sound playing function or an image playing function). In addition, the memory 1809 may be a volatile memory or a nonvolatile memory, or the memory 1809 may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synch link dynamic random access memory (SLDRAM), and a direct rambus random access memory (DRRAM). The memory 1809 in this embodiment of this application includes but is not limited to these memories and any memory of another proper type.

The processor 1810 may include one or more processing units. Optionally, an application processor and a modem processor are integrated into the processor 1810. The application processor mainly processes an operating system, a user interface, an application, or the like. The modem processor mainly processes a wireless communication signal, for example, a baseband processor. It may be understood that, the modem processor may alternatively not be integrated into the processor 1810.

An embodiment of this application further provides a readable storage medium. The readable storage medium stores a program or an instruction, and when the program or the instruction is executed by a processor, processes of the foregoing embodiments of the message processing method applied to an electronic device are implemented, and a same technical effect can be achieved. To avoid repetition, details are not described herein again.

An embodiment of this application further provides a readable storage medium. The readable storage medium stores a program or an instruction, and when the program or the instruction is executed by a processor, processes of the foregoing embodiments of the message processing method applied to a cloud are implemented, and a same technical effect can be achieved. To avoid repetition, details are not described herein again.

The processor is a processor in the electronic device in the foregoing embodiment. The readable storage medium includes a computer-readable storage medium, such as a computer read-only memory ROM, a random access memory RAM, a magnetic disk, or an optical disc.

An embodiment of this application further provides a chip. The chip includes a processor and a communication interface, the communication interface is coupled to the processor, and the processor is configured to run a program or an instruction to implement processes of the foregoing embodiments of the message processing method applied to an electronic device, and a same technical effect can be achieved. To avoid repetition, details are not described herein again.

An embodiment of this application further provides a chip. The chip includes a processor and a communication interface, the communication interface is coupled to the processor, and the processor is configured to run a program or an instruction to implement processes of the foregoing embodiments of the message processing method applied to a cloud, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program product. The software product is stored in a storage medium, and the software product is executed by at least one processor to implement processes of the foregoing embodiments of the message processing method applied to an electronic device, and a same technical effect can be achieved. To avoid repetition, details are not described herein again.

An embodiment of this application further provides a computer program product. The software product is stored in a storage medium, and the software product is executed by at least one processor to implement processes of the foregoing embodiments of the message processing method applied to a cloud, and a same technical effect can be achieved. To avoid repetition, details are not described herein again.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to this process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the implementations of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the foregoing specific implementations, and the foregoing specific implementations are only illustrative and not restrictive. Under the enlightenment of this application, a person of ordinary skill in the art can make many forms without departing from the purpose of this application and the protection scope of the claims, all of which fall within the protection of this application.

What is claimed is:

1. A message processing method, applied to an electronic device, wherein the method comprises:

receiving a first message and related information of the first message, wherein the related information comprises identification information of a sender of the first message and group identification information of a target instant messaging group;

obtaining identification information that is of a first user and that is delivered by a cloud, wherein the first user is a user in the target instant messaging group who does not process a second message;

determining that the second message is not processed by a user corresponding to the electronic device in a case that identification information of the user corresponding to the electronic device matches the identification information of the first user; and prompting the first message in a case that the first message matches the second message and the second message is not processed, wherein the second message is a historical message in the target instant messaging group.

2. The method according to claim 1, wherein before the prompting the first message in a case that the first message matches the second message and the second message is not processed, the method further comprises:

monitoring whether the second message satisfies a processed condition, wherein the processed condition comprises at least one of the following: the second message is clicked, a processing status corresponding to the second message is processed, or display duration of the second message reaches preset duration; and determining that the second message is not processed in a case that the second message does not satisfy the processed condition.

3. The method according to claim 1, wherein the prompting the first message comprises:

displaying the first message in an instant messaging interface corresponding to the target instant messaging group.

4. A non-transitory readable storage medium, wherein the non-transitory readable storage medium stores a program or an instruction, and when the program or the instruction is executed by a processor, steps of the message processing method according to claim 1 are implemented.

5. A message processing method, applied to a cloud, wherein the method comprises:

obtaining a first message;

determining identification information that is of a first user in a target instant messaging group and that satisfies a preset condition, in a case that the first message matches a second message, wherein the second message is a historical message in the target instant messaging group; and sending the first message to an electronic device corresponding to the first user based on the identification information of the first user;

wherein the preset condition comprises not processing the second message; and the determining identification information that is of a first user in a target instant messaging group and that satisfies a preset condition comprises:

determining, based on processing information of each member in the target instant messaging group for the second message, identification information of a first user in the target instant messaging group who does not process the second message;

wherein the sending the first message to an electronic device corresponding to the first user based on the identification information of the first user comprises:

sending the first message, identification information of a sender of the first message, and group identification information of the target instant messaging group to the electronic device corresponding to the first user.

6. The method according to claim 5, further comprising:

obtaining the processing information of each member in the target instant messaging group for the second message, wherein the processing information comprises the group identification information of the target instant messaging group, and at least one of the following: whether each member successfully receives the second message, identification information of a member who successfully receives the second message, identification information of a member who does not successfully receive the second message, whether each member has processed the second message, identification information of a member who has processed the second message, or identification information of a member who does not process the second message;

collecting statistics on message statistics information of the second message based on the processing information, wherein the message statistics information comprises at least one of the following: a quantity of third users who successfully receive the second message, a proportion of the third users to the members, a quantity of fourth users who do not successfully receive the second message, a proportion of the fourth users to the members, a quantity of first users who do not process the second message, a proportion of the first users to the members, a quantity of second users who have processed the second message, or a proportion of the second users to the members; and sending the message statistics information to a sender of the first message.

7. An electronic device, comprising a processor, a memory, and a program or an instruction that is stored in the memory and that can be run on the processor, wherein the program or the instruction, when executed by the processor, causes the electronic device to perform the steps of the message processing method according to claim 5.

8. The electronic device according to claim 7, the program or the instruction, when executed by the processor, causes the electronic device to further perform:

obtaining the processing information of each member in the target instant messaging group for the second message, wherein the processing information comprises the group identification information of the target instant messaging group, and at least one of the following: whether each member successfully receives the second message, identification information of a member who successfully receives the second message, identification information of a member who does not successfully receive the second message, whether each member has processed the second message, identification information of a member who has processed the second message, or identification information of a member who does not process the second message;

collecting statistics on message statistics information of the second message based on the processing information, wherein the message statistics information comprises at least one of the following: a quantity of third users who successfully receive the second message, a proportion of the third users to the members, a quantity of fourth users who do not successfully receive the second message, a proportion of the fourth users to the members, a quantity of first users who do not process the second message, a proportion of the first users to the members, a quantity of second users who have processed the second message, or a proportion of the second users to the members; and sending the message statistics information to a sender of the first message.

9. A non-transitory readable storage medium, wherein the non-transitory readable storage medium stores a program or an instruction, and when the program or the instruction is executed by a processor, steps of the message processing method according to claim 5 are implemented.

10. An electronic device, comprising a processor, a memory, and a program or an instruction that is stored in the memory and that can be run on the processor, wherein the program or the instruction, when executed by the processor, causes the electronic device to perform:

receiving a first message and related information of the first message, wherein the related information comprises identification information of a sender of the first message and group identification information of a target instant messaging group;

obtaining identification information that is of a first user and that is delivered by a cloud, wherein the first user is a user in the target instant messaging group who does not process a second message;

determining that the second message is not processed by a user corresponding to the electronic device in a case that identification information of the user corresponding to the electronic device matches the identification information of the first user; and prompting the first message in a case that the first message matches the second message and the second message is not processed, wherein the second message is a historical message in the target instant messaging group.

11. The electronic device according to claim 10, wherein before prompting the first message in a case that the first message matches the second message and the second message is not processed, the program or the instruction, when executed by the processor, causes the electronic device to further perform:

monitoring whether the second message satisfies a processed condition, wherein the processed condition comprises at least one of the following: the second message is clicked, a processing status corresponding to the second message is processed, or display duration of the second message reaches preset duration; and determining that the second message is not processed in a case that the second message does not satisfy the processed condition.

12. The electronic device according to claim 10, wherein when prompting the first message, the program or the instruction, when executed by the processor, causes the electronic device to perform:

displaying the first message in an instant messaging interface corresponding to the target instant messaging group.

* * * * *